Aug. 8, 1950        C. DOD        2,517,641

OXYGEN JET METAL CUTTING NOZZLE

Filed Feb. 13, 1947

INVENTOR.
CEDRIC DOD

BY
Hyde, Meyer, Baldwin & Doran
ATTORNEYS

Patented Aug. 8, 1950

2,517,641

UNITED STATES PATENT OFFICE 2,517,641

OXYGEN JET METAL-CUTTING NOZZLE

Cedric Dod, Giffnock, Scotland

Application February 13, 1947, Serial No. 728,274
In Great Britain February 19, 1946

1 Claim. (Cl. 158—27.4)

The invention has reference to oxygen jet metal cutting nozzles.

In oxygen jet metal cutting nozzle formations there is a heating jet by which an oxygen-acetylene or other heating flame is directed on the metal to be cut and a cutting jet by which oxygen is directed on the heated metal to cut therethrough.

In the standard type of such nozzle formations in normal use a heating jet in the base thereof surrounds the cutting jet either as a complete annulus or as a series of jets. Such nozzle formation can be moved in any direction as the metal is always heated in advance of the cutting jet. Further, nozzle formations have been provided with a single round heating jet, such nozzle being mainly used for cutting light steel plates in a straight line, or by turning the nozzle so that the heating jet is always leading, used for cutting profiles. In this last mentioned type of nozzle the cutting jet has been directed at a slight forward angle relative to the heating jet and the cutting jet portion of the nozzle has been extended beyond the base so as to bring it nearer to the plate being cut than the heating jet.

Further it is known in oxygen jet metal cutting nozzle formations to provide an additional heating nozzle located substantially in advance of the heating and cutting jets.

The present invention has for its primary object to provide an improved construction of such nozzles particularly suitable for cutting in a straight line or in curves of considerable radius and by which, in comparison with the nozzles of standard design, an increased rate of cut for the same gas consumption can be obtained, or alternatively, by sacrificing increased speed of cut, a reduction in the consumption of the heating gas is obtained.

According to the present invention in an oxygen jet metal cutting nozzle formation the base of the nozzle formation is provided with a series of heating jets or a long heating jet by which, when a plate is being cut, a heating flame or combination of flames is spread out in the line of cut with the hottest part thereof equally spaced from the plate, and the cutting jet is such that it directs the oxygen forward at an angle to the line of cut, the heating and cutting jet being such that the length of cut acted on by the flame or combination of flames and the oxygen at any instant does not exceed one inch.

The invention further consists in an oxygen jet metal cutting formation as set forth in the preceding paragraph wherein the heating and cutting jets are such that, when cutting a plate, the cutting jet is nearer to the plate than the heating jet or jets. In such oxygen jet metal cutting formation side screens may be provided to screen the heating jet or jets.

The invention further consists in an oxygen jet metal cutting formation as set forth in either of the preceding paragraphs wherein a further cutting jet is provided to cut the plate at a bevel or other edge form.

A feature of the invention consists in that the cutting jet is of such formation that it converges at its inlet end then diverges toward the exit.

Preferred embodiments of the invention will now be described with reference to the annexed drawings wherein:

Figure 1 is a sectional elevation of an oxygen jet metal cutting formation in accordance with the invention.

Figures 2 and 3 both show sectional elevations of developments in the construction shown in Figure 1.

In the various figures the same reference letters denote the same or corresponding parts.

Figure 1:
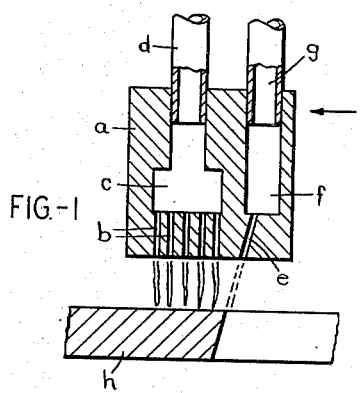

In the construction shown in Figure 1 the base of the oxygen jet metal cutting formation $a$ is provided with a series of aligned heating jets $b$ communicating with a chamber $c$ which in turn is connected by means of a pipe $d$ to the acetylene or other heating gas supply. There may be, for example, about five or six of such jets each about .025 inch in diameter. The oxygen jet $e$ is directed forwardly as shown, said jet communicating with a chamber $f$ which is connected by means of a pipe $g$ with the oxygen supply. The oxygen jet metal cutting formation is shown surmounting a metal plate $h$, the line of cut being as indicated by the arrow. The heating and cutting jets are such that the length of the line of cut acted on at any instant by the flames and oxygen should not exceed one inch and is in preference within a compass of about half an inch. As the cutting jet is in close proximity to the heating jets there is no substantial dissipation of the heat imparted to the line of cut prior to the cutting jet of oxygen action thereof.

It will be noted that the heating jets direct a flame or combination of flames in the line of cut and that the hottest part of said flame or combination of flames impinges uniformly on the metal being cut. The cutting jet does not direct the oxygen at right angles to the plate but directs the jet forwards. The angle of the cutting jet may vary from about 5° to 45°.

Where the cutting jet is projected forward to the extent of 10° an increase in the speed of cut is obtained, or a corresponding economy in heating gas and where it is projected forward at a larger angle, say 45°, there is a substantial increase in speed with rougher cuts.

It has been found that the further away the heating flame or combination of flames impinges on the plate from the point where oxygen impinging thereon, the less effective or efficient it is as the heat imparted to the plate has time to dissipate from the line of cut before the oxygen acts thereon.

The heat is therefore supplied as close as practicable to the oxygen jet. But one heating orifice, large enough to cut at a good speed to suit any plate above about $\frac{7}{8}$ of an inch when cutting would require a large bore, possibly 0.05 inch diameter and above, and this is prone to backfiring. Further one such jet does not spread along the line of cut far enough to be over any particular spot on the plate long enough to transfer sufficient heat at a high speed. For best results, the heat supply to the plate is spread out in the line of cut, but one half to three quarters of an inch of the point at which the oxygen acts. A relatively small amount of heat may be added in advance of this mainly for the purpose of scaling the plate, but it is uneconomical as a means of raising the plate temperature.

When oxygen-acetylene is used for the heating flame suitable sizes would be as follows: Eight jets of 0.025 inch bore spaced 0.07 apart, and the last one 0.15 inch from the cutting orifice. This equals in area and consumption average standard nozzles which place them in a circle surrounding the cutting jet, yet is about three times as effective, for it allows three times normal speeds providing that sufficient cutting oxygen is used, without losing the cutting action through lack of heat. For slower speeds the number of jets will be reduced, preferably not less than three in order to form a spread out effect.

In lieu of the nozzle formation being formed as a unit the heating and cutting jets may be formed as separate units suitably coupled together.

Such nozzle formation as above particularly described is very suitable where acetylene is used as the heating gas.

In operation the improved nozzle formation is moved over the plate to be cut either in a straight line or in a curve of large radius. In preference the nozzle formation is carried by a power driven machine by which the clearance is kept constant. The flame or combination of flames from the series of aligned heating jets raise the temperature of the metal to the required degree and the forwardly directed cutting jet of oxygen following closely in the path of the heating jets, cuts through the metal.

If desired two such nozzle formations located side by side and formed as a single unit or otherwise may be employed.

Further, if desired two or three of such nozzle formations may be combined to cut bevel and nose edges or other edge contour, the nozzle formations being adjusted to cut at different angles, and where the nozzle formations are closely adjacent, as is preferable, the heating jets of the second or third, or both may be reduced or omitted.

In lieu of the heating jets being located in a row they may be arranged in a plurality of rows, or in a cluster, all or the majority of such jets being located in advance of the cutting jet. There may be for example about twenty such heating jets. A nozzle formation so constructed is particularly suitable for use with propane, coal gas or the like relatively low temperature burning gases as the heating gas. Or the heating jet may be in the form of a narrow slot by which a narrow jet lying in the line or substantially in the line of cut is directed on the metal in advance of the cutting jet and in close proximity thereto.

Figure 2:
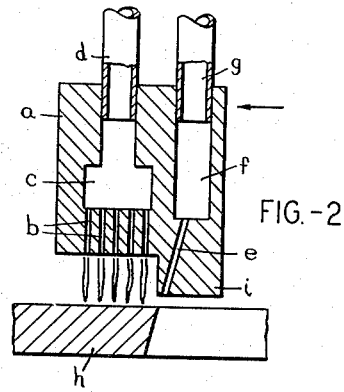
Figure 3:
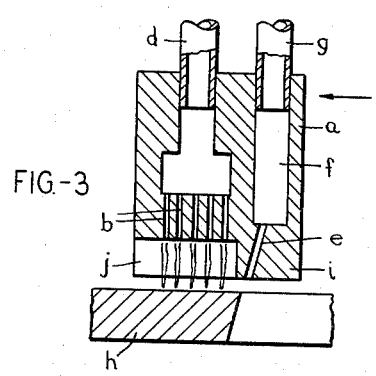
Figure 4:
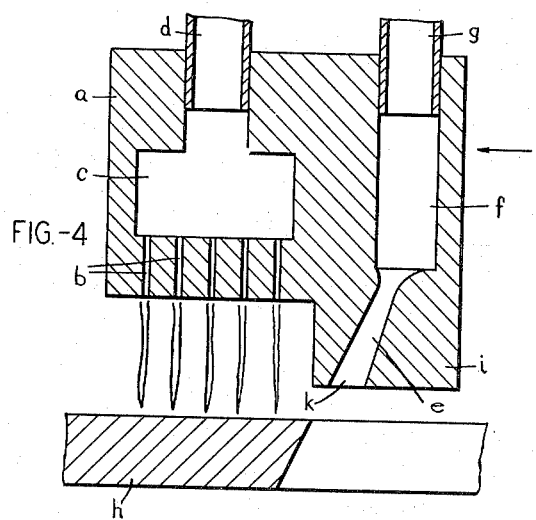
Figure 4 is a sectional elevation to a larger scale of an oxygen jet metal cutting formation, the oxygen jet being of converging-diverging cross section.

The construction shown in Figure 2 differs from that shown in Figure 1 in that the base of the formation is stepped as at $i$, so that the cutting jet $e$ is nearer to the plate $h$ being cut than the heating jets $b$. The heating flame or flames may be provided with side screens $j$ as shown in Figure 3. In the construction shown in Figure 4 the cutting jet is of a special formation in cross section. As shown said jet converges at the entrance as indicated and thereafter gradually diverges towards the outlet as at $k$.

Figure 5:
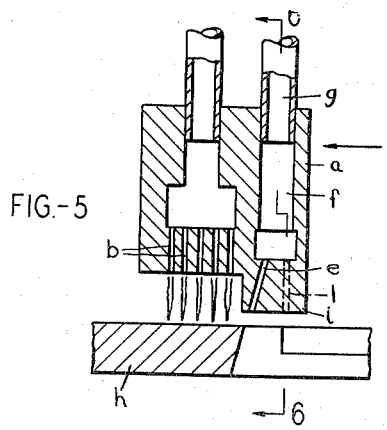
Figure 5 is a sectional elevation of an oxygen jet metal cutting formation corresponding to Figure 2 but showing a further oxygen jet for cutting a bevel and Figure 6 is a section on the line 6—6 Figure 5.
Figure 6:
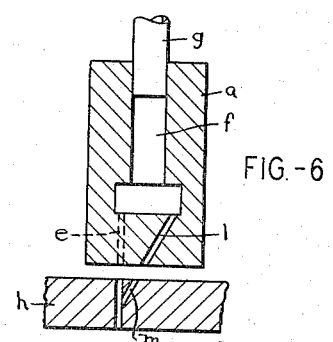

In the construction shown in Figures 5 and 6 the oxygen jet metal cutting formation is provided in addition to the forwardly directed cutting jet $e$ with a further cutting jet $l$. This jet is arranged at an angle transversely to the line of cut so that while the oxygen directed by the jet $e$ cuts through the plate in a plane normal thereto the jet $l$ directs a jet of oxygen to bevel one of the cut faces as indicated at $m$.

In using nozzle formations in accordance with the invention and using low temperature gas such as propane or coal gas as the heating gas an increase of about 50% in the rate of cut is obtained in comparison with nozzles of standard design and using the same amount of heating gas, and a still further increase is obtained with acetylene as the heating gas. Or, by sacrificing speed, a corresponding economy is obtained in the amount of heating gas.

Having now particularly described and ascertained the nature of my said invention and in what manner the same is to be performed, I declare that what I claim is:

An oxygen jet cutting nozzle of the character described having a base surface normally disposed adjacent the work to be cut, and having leading and trailing wall surfaces with relation to the normal direction of cutting movement, said nozzle having therewithin a heating gas chamber and a cutting gas chamber, each in communication with a respective gas supply source, the base portion of said nozzle being perforated to provide a series of heating gas discharge passages aligned to be within a single vertical plane intersecting said base and said leading and trailing wall surfaces, the inner ends of said passages communicating with said heating gas chamber and the outer ends of said passages opening through said base surface adjacent the leading end thereof, the wall of said base portion being further perforated to provide a cutting gas discharge passage communicating at its inner end with said cutting gas chamber and at its outer end opening through said base rearwardly of said heating gas discharge passages, and said cutting gas discharge passage being likewise in the aforesaid vertical plane, said cutting gas discharge passage being aligned downwardly towards said base and forwardly towards said heating gas discharge passages, whereby to be out of vertical relationship with the surface of the work when the nozzle is in normal cutting position, the part of the base portion in which said heating gas discharge passages terminate being recessed upwardly to provide a longitudinal channel into which said heating gas discharge passages discharge, whereby to provide screening means for the heating gas jets.

CEDRIC DOD.

REFERENCES CITED

The following references are of record in the file of this patent:

UNITED STATES PATENTS

| Number | Name | Date |
|---|---|---|
| 1,377,001 | Bucknam | May 3, 1921 |
| 1,418,688 | Theberath | June 6, 1922 |
| 1,604,890 | Eastman, et al. | Oct. 26, 1926 |
| 1,919,764 | Anderson | July 25, 1933 |
| 2,031,583 | Anderson | Feb. 25, 1936 |
| 2,129,672 | Bucknam | Sept. 13, 1938 |
| 2,175,160 | Zabel et al. | Oct. 3, 1939 |
| 2,202,130 | Wagner | May 28, 1940 |
| 2,322,300 | Linden | June 22, 1943 |
| 2,343,958 | Crowe | Mar 14, 1944 |

FOREIGN PATENTS

| Number | Country | Date |
|---|---|---|
| 366,779 | Germany | Jan. 11, 1923 |
| 651,539 | Germany | Oct. 15, 1937 |